VISUAL CONTROL SYSTEM
Original Filed March 16, 1967 3 Sheets-Sheet 1
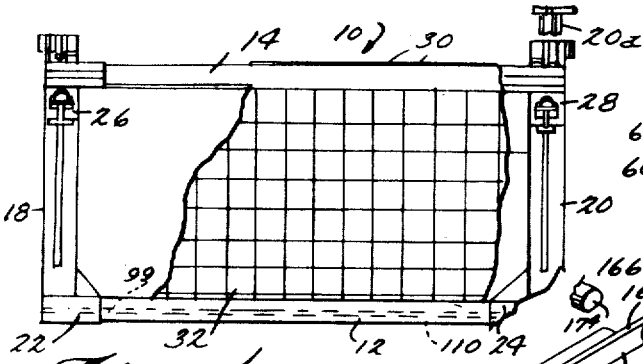
Fig. 1.
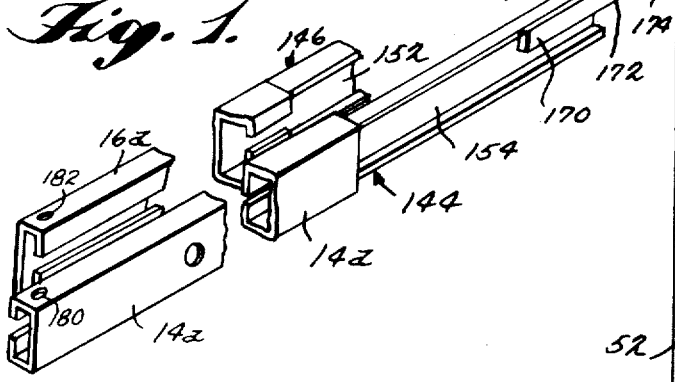
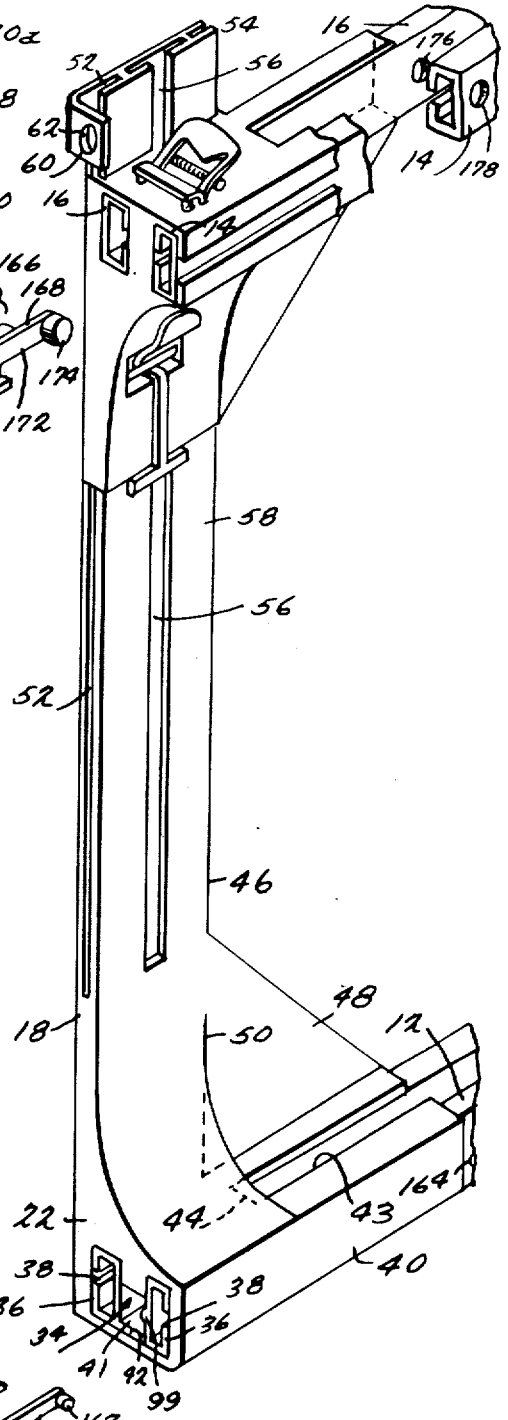
Fig. 3.
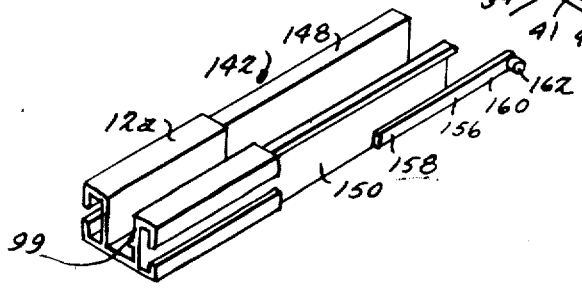

VISUAL CONTROL SYSTEM

Original Filed March 16, 1967 3 Sheets-Sheet 1

VISUAL CONTROL SYSTEM
Original Filed March 16, 1967 3 Sheets-Sheet 3
Fig. 4.
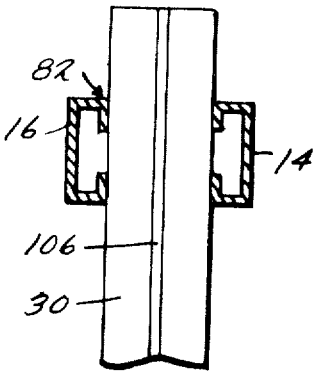
Fig. 5.
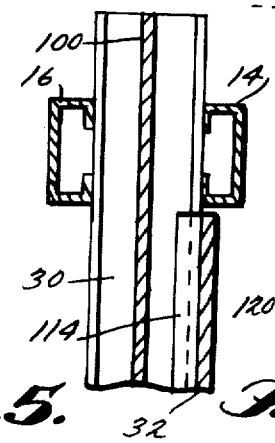
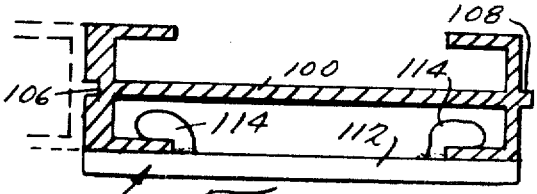
Fig. 6.
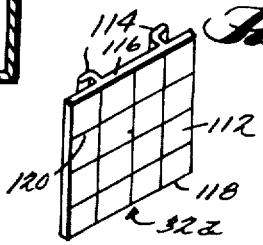
Fig. 7a.
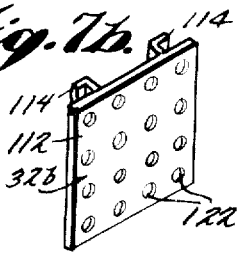
Fig. 7b.
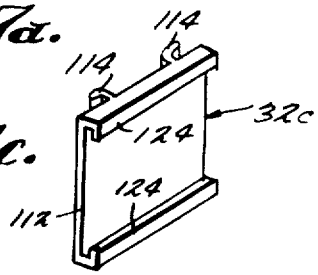
Fig. 7c.
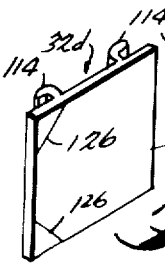
Fig. 7d.
Fig. 7e.
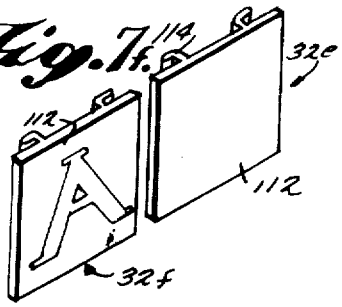
Fig. 7f.
Fig. 8.
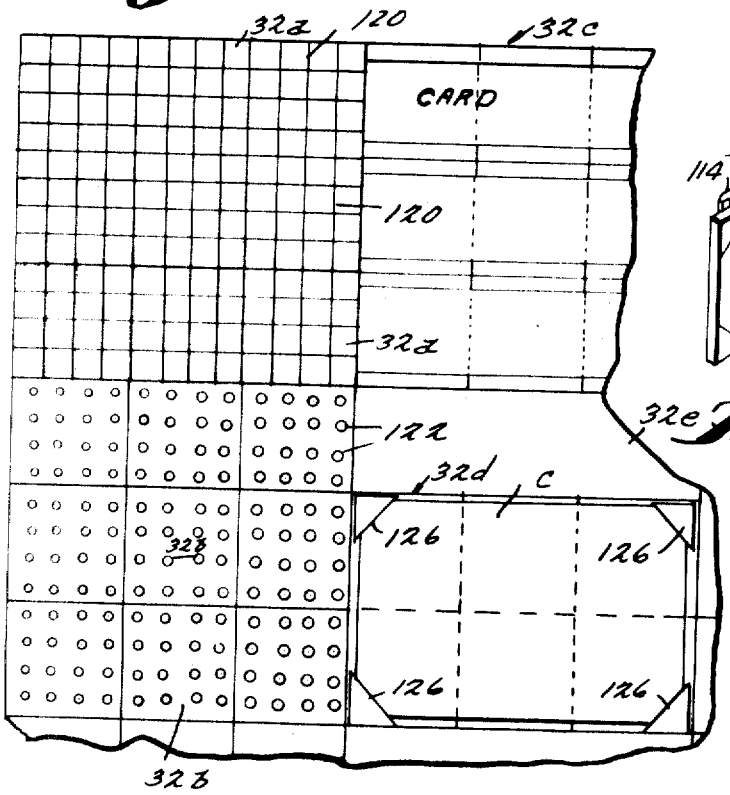

United States Patent Office

Re. 27,952
Reissued Mar. 26, 1974

27,952
VISUAL CONTROL SYSTEM

William F. Pollacco, Capitol Heights, Md., assignor to David A. Boote, Alexandria, and Harvey R. Lampshire, Arlington, Va., Robert A. Diemer, Prince Georges County, Md., Bernard A. Schriever, Washington, D.C., and Walter Bogley, Mount Rainier, Md., fractional part interest to each Original No. 3,475,843, dated Nov. 4, 1969, Ser. No. 623,656, Mar. 16, 1967. Application for reissue Oct. 22, 1971, Ser. No. 191,787
Int. Cl. G09f *1/12, 7/08*
U.S. Cl. 40—63 R 23 Claims

Matter enclosed in heavy brackets [ ] appears in the original patent but forms no part of this reissue specification; matter printed in italics indicates the additions made by reissue.

ABSTRACT OF THE DISCLOSURE

A modular device including backing tracks, frame members and diverse face pieces wherein individual columnar backing tracks track array bordering frame members and face pieces can be added to and removed from the device as needed depending upon the amount and character of the information to be displayed. The rear faces of the face pieces are provided with rearwardly projecting undercut rails by which they are slidingly, removably received on the backing tracks. The rails extend between opposite edges of respective face pieces in order to prevent buckling and ensure flushness and squareness of the face pieces with respect to one another. The foregoing abstract is not intended to be a digest of the principles or scope of the invention disclosed in this document.

Background of the invention

Visual control systems are in wide, and increasing, use both in business and in government for displaying information in a compact easily understood form. Among planners such systems are used in architectural layouts, engineering drawings, printed circuit and microminiature circuit layout PERT planning, EDP programming and the like. Similar systems are also used to provide organizational and functional charts, advertising displays, educational aids, project control, personnel duty schedules, call boards and the like. Among management, visual control systems are used to display budget progress, bar charts, job progress, production control, parameters, vehicle maintenance schedules, sales analysis, inventory and stock control; bus, train, plane, ship arrivals and departures and the like.

In some instances, visual control systems are made up, photographed then changed or dismantled, the photograph being used as illustrations in text books, weekly news magazines, corporate annual reports and the like. In other instances, such visual control systems are made up specifically for use upon a single occasion for instance a meeting of management to consider the pros and cons of making a particular investment. Other visual control systems are made up and displayed indefinitely, with additions or changes being made in the information displayed in order to keep the systems current.

Prior art visual control systems are generally not suited to all three types of uses just mentioned, are adapted to display a narrow range of information media and are ill adapted to changing requirements so that they often must be scrapped and replaced before their components have become worn. For instance, a sales division of a company may have four salesmen which visit the trade selling its three products. The prior art stencilled grid visual control system includes a monthlychanging display of the relative success of each salesman (four columns) in selling each product (three rows). With the passage of, for instance eight months from the time the prior art visual control device was purchased, one salesman may have been promoted to sales manager, one salesman may have departed, the company may have begun marketing a line of three new products and four new salesmen may have been hired. Because the prior art visual control system was not able to adapt to these changes, it became progressively less useful during the eight months period and had to be scrapped.

In another example, it is not unusual for a graphic artist to spend a week or more of working time on a visual control device, then find that through mistake or faulty communication, one or more columns in the middle of the system were transposed, omitted or were not supposed to have been made a part of the system. Most prior art visual control systems are sufficiently inflexible that when such a mistake or misunderstanding has occurred, the graphic artist must start all over again and prepare another device.

Summary of the invention

It is the purpose of the present invention to provide a visual control system that can be used to display a wide range of information for diverse purposes using many types of information-conveying media, wherein the system can accommodate expansion, contraction and radical change in the amount and character of the information to be displayed and which can be corrected at the time a mistake is made without necessity for redoing of the display or individual manipulation of large numbers of information conveying media.

Brief description of the drawing

The invention may be best understood having reference to the accompanying drawings wherein a preferred embodiment is illustrated.

In the drawings:

FIGURE 1 is a front elevation view of a visual control system according to the present invention;

FIGURE 3 is a fragmentary perspective view of the left side region of the system of FIGURE 1, showing modular means for increasing the width of the indicia receiving array;

FIGURES 4, 5 and 6 are fragmentary sectional views respectively taken along lines 4—4, 5—5 and 6—6 of FIGURE 2;

FIGURES 7a–7f are perspective views of different individual face pieces for use with the system of FIGURE 1; and FIGURE 8 is a front elevation view of part of a mixed media face piece array in use on the system of FIGURE 1.

Description of the preferred embodiment

Figure 2:
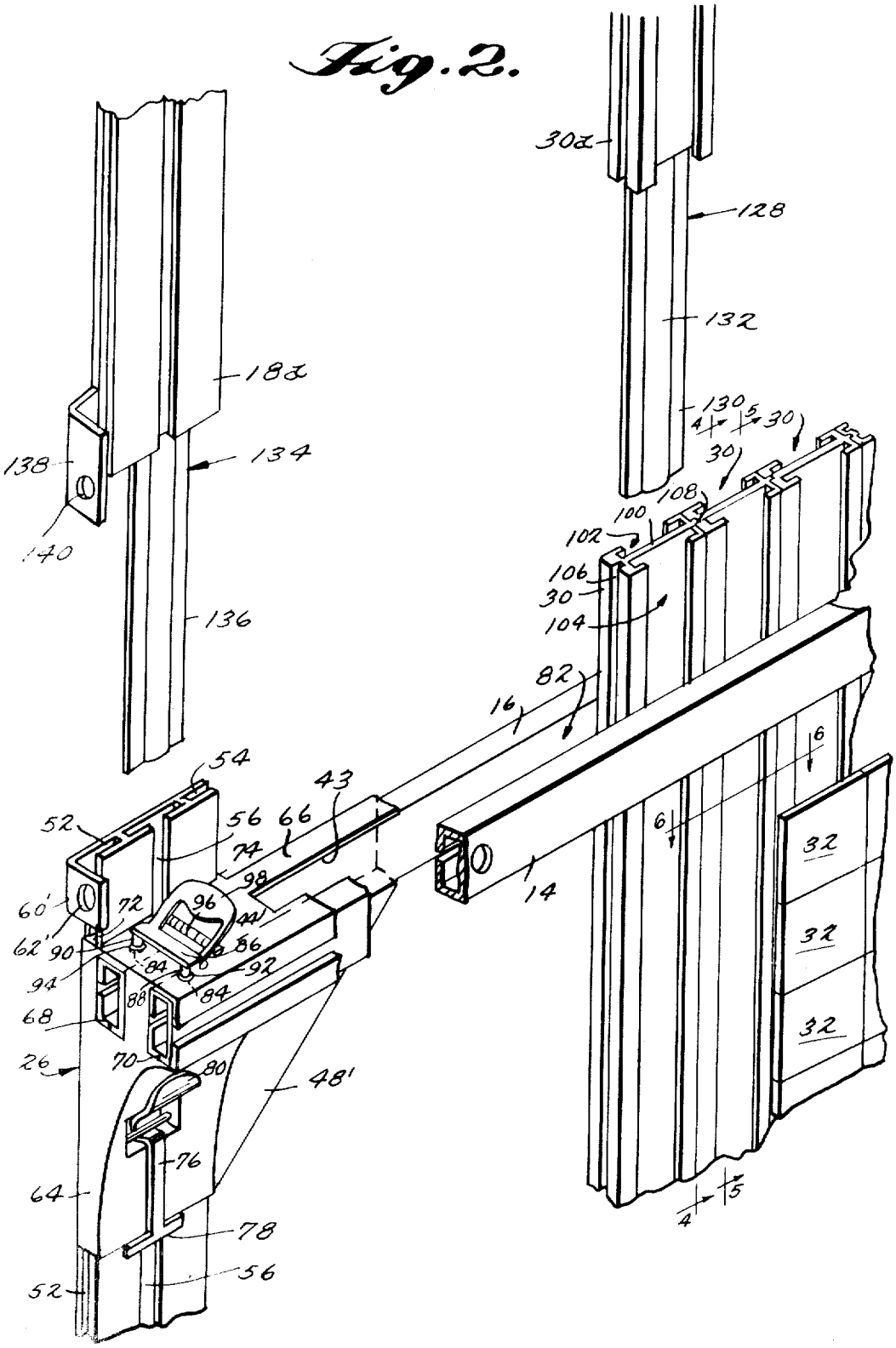
FIGURE 2 is a fragmentary perspective view of the upper left region of the system of FIGURE 1, showing modular means for increasing the height of the indicia receiving array.

The basic device 10 comprises a bottom frame element 12; top frame front and rear frame elements 14, 16; left and right side frame elements 18, 20 respectively including integral lower corner brackets 22, 24; upper corner brackets 26, 28, face piece holder backing sections 30 in which face pieces 32 are removably received. To expand the basic devices 10, bottom frame element extensions 12a; top frame front and rear frame element extensions 14a, 16a, left and right side frame element extensions 18a, 20a, additional face piece holder backing sections 30, face piece holder backing section extensions 30a and additional face pieces 32 are used as will be more fully explained hereinafter.

As shown in the drawings, the bottom frame element 12 is generally horizontal and rectilinear, having a central upwardly opening longitudinal channel 34 defined between two rectangular generally tubular elements 36. The latter as seen in transverse cross-section are generally C-shaped laterally outwardly, being slotted at 38 and having a common base with the floor 41 of the channel 34. The element 12, as most of the elements of the visual control system may conveniently be extruded in long sections from metals such as aluminum, magnesium, or the like, plastics, or be otherwise formed for instance by the bending of sheet metal then cut into appropriate lengths.

Because of the slots 38 the tubular elements 36 are expansible and contractile to a limited extent.

The left and right side frame elements 18, 20 as shown, are mirror image replicas of one another. Describing the left element 18, shown best in FIGURE 3, the generally vertically elongated rectilinear element 18 is provided at its lower end with an integral, right angle corner bracket 22 that has a horizontal rightwardly extending portion 40. The latter is generally tubular, having a bore 42 complementarily configured to snugly slidingly receive the left end of the bottom frame element 12. Resilient contraction of the bottom frame element 12 and tubular elements 36 accomplishes frictional securement of the corner bracket 22 at the desired location on the bottom frame element 12.

In order to maximise the usable horizontal length of the device 10, the top of the corner bracket portion 40 is slotted at 43 from its rightward end, back to 44 in line with the right edge 46 of the remainder of the left element 18. To ensure structural integrity of the corner bracket 22 and squareness of the device 10, the bracket 22 is provided with an integral triangular web 48 which joins the corner bracket portion 40 behind the slot 43 and joins the vertically extending remainder of the corner bracket and left element 18 at the rear of the lower extent of the left element 18 at 50.

Upwardly from the corner bracket 22, the left frame element 18 is of constant transverse cross-section, resembling, as seen from above in transverse cross-section, two H shaped portions having their vertical members in alignment, being spaced from one another except for a web which integrally joins the lower end of the left vertical member of the upper H shaped portion to the upper end of the left vertical member of the lower H shaped portion. Thus, returning to the orientation of FIGURE 3, the left frame element has oppositely laterally opening vertically elongated channels 52, 54 in its two sides and a forwardly opening, vertically elongated channel 56 in its front face 58. At its upper end, the rear of the left frame element is provided with a lock tab 60 which proceeds laterally leftwardly, then forwardly, having a socket 62 formed in its forwardly extending portion.

The upper right-angle corner brackets 26, 28 are mirror image replicas of one another and strongly resemble their lower corner bracket counterparts. Parts which are substantially the same have been given primed numerals. The left upper corner bracket 26 will now be described.

The bracket 26 comprises a vertical downwardly extending portion 64 at its left and an upper, rightwardly extending horizontal portion 66. The latter is generally biluminal tubular, having side-by-side generally rectangular bores 68. 70.

The bracket 26 is adjustably secured to the left side frame element by two opposed tabs 72, 74 which protrude rearwardly then toward one another from opposite vertical side margins of the bracket portion 64, these being slidingly received in the channels 52 and 54 respectively; and by a spring urged clamp 76 mounted on the bracket portion 64. The clamp 76 normally resiliently frictionally engages the front face of the left frame element at 78, but vertical movement of the bracket 26 can be effected by depressing the tongue 80 of the clamp, bringing the clamp to the new desired position and releasing the tongue 80.

The frame of the basic device 10 is completed by a top frame rear element 16 which is resiliently slidingly received in and extends between bores 68 of brackets 26, 28 and by a top frame front element 14 which is resiliently slidingly received in and extends between bores 70 of brackets 26, 28. The elements 14 and 16 are generally parallel, coextensive and spaced a short distance from one another with respect to the front-to-back dimension of the device 10 so as to define a horizontally extending vertically opening gap 82. Each element 14, 16 is generally rectangular tubular, slotted down one side to provide resiliency. A vertically upwardly opening detent or opening 84 is formed in the upper surface of each element 14, 16 near each end thereof. The bracket 26 is adjustably secured to the elements 14, 16 by a spring urged clamp 86 mounted on the top of the bracket portion 66. The clamp 86 has two downwardly directed prongs 88, 90 respectively positioned to pass through vertical openings 92, 94 in the bracket portion 66 and engage in the detents or openings 84 of the left ends of the elements 14, 16. Corresponding elements on the bracket 28 secure it to the elements 14, 16 at the right ends thereof. The spring 96 normally urges the prongs 88, 90 into the detents or openings 84, but horizontal movement of the bracket 26 can be effected by depressing the tongue 98 of the clamp 86, bringing the clamp to the new desired position and releasing the tongue 98.

It should now be noticed that the forward wall of the longitudinal channel 34 of the bottom frame element is provided with a bead 99 which projects into the channel along its length to constrict the channel. A plurality of face piece holder backing sections 30 are removably received in the frame of the device 10 from above. Each section 30 as seen in transverse cross-section has a central web 100 and an L-shaped flange means at each lateral edge of the front and rear faces thereof defining an undercut rearwardly facing channel 102 and an undercut forwardly facing channel 104 on each section 30. As shown the sections 30 are generally of constant cross-sectional shape and may conveniently be extruded of plastics or metal. The sections 30 as shown are further provided with a groove 106 running centrally down the left side of each and a complementary tongue 108 running centrally down the right side of each. Fore and aft of the tongues and grooves, the section sides are normal to the front of the display 10. Accordingly, adjacent section tongues and grooves interfit with one another and the abutment of adjacent section sides keeps the array of sections 30 desirably coplanar. The sections 30 are each slipped through the gap 82 and advanced downwardly until their lower ends bottom in the channel 34. The forward face of each section 30 immediately adjacent the lower end thereof is preferably provided with a protuberance 110 which resiliently snaps over the channel bead 99 as the sections 30 are advanced into place. This interengagement is sufficient to prevent the sections 30 from falling out even if the device 10 is turned upside down, but insufficient to prevent intentional upward removal of individual sections 30 by tugging.

With attention to FIGURES 5–7, each faces piece 32 comprises a generally planar, vertical forward portion 112 from which a pair of parallel, laterally spaced vertical rearwardly projecting tabs 114 extend. The portions 112 are preferably square or rectangular and include horizontal upper and lower edges 116, 118. The tabs 114 terminate flush with the respective edges 116, 118. At the rearward ends thereof, the tabs 114 on each face piece 32 diverge from one another. The face pieces 32 are preferably formed of stiffly resilient material such as synthetic thermoplastic material or aluminum. Accordingly, each face piece 32 can be individually snapped into and removed from the forwardly opening undercut channels of the face piece holder backing sections 30. Because the tabs 114 are vertically coextensive with the faces 112 they act as columns on each section 30 to prevent buckling of the lower face pieces under the weight of upper face pieces.

The individual face pieces 32 can carry a variety of information using a variety of media according to the present invention. The front 112 of the face piece 32a is shown in FIGURE 7a and FIGURE 8 is provided with a modular grid 120 facing especially suited for quantitative and spatial planning as well as visually representing alternative courses in problem solution. Those familiar with visual representation of information will realize that many techniques can be employed in placing information on the grid 120, such as grease pencil, felt tipped pen, pressure sensitive colored tape lines and symbols, and the like.

The front 112 of the face piece 32b shown in FIGURE 7b and FIGURE 8 is provided with front-to-back holes 122 set in a modular rectangular grid pattern for removably receiving pegs of indicia markers. The front 112 of the face piece 32c shown in FIGURES 7c and 8 is integrally provided along its upper and lower margins with a pair of forwardly projecting flanges 124 which extend toward one another at their forward ends for horizontally slidingly receiving a card having indicia thereon. Another card holder face piece 32d is shown in FIGURES 7d and 8. The front 112 of the latter is provided with one or more diagonal slits or corner mounts 126 for removably receiving the one or more corners of an indicia bearing card. As shown in FIGURE 8, each card holder face piece 32d has one corner mount 126. Thus a card C is cooperatively carried by the corner mounts of four correspondingly arrayed face pieces 32d.

The face piece 32e of FIGURES 7e and 8 has a magnetic front 112 for removably retaining indicia markers having ferromagnetic bits in them. Conversely, the face piece 32e front can be made of unmagnetized ferromagnetic material for receiving indicia markers having permanently magnetized bits in them. The face piece 32f of FIGURES 7f and 8 has indicia directly, permanently applied to the face 112 thereof, for instance by printing or labeling thereon.

Now having more particular attention to FIGURES 2 and 3, the method and means for enlarging and contracting the potential indicia array will be discussed in more detail. To provide for vertical expansion and contraction of the basic display 10, backing section extensions 128 are provided, each having a transverse cross-section identical to that of the sections 30, throughout most of its length and each being provided at its lower end with a rear, downwardly axially extending tongue 130 constructed and arranged to be slidingly received in an undercut rearwardly facing channel 102 of a respective section 30. The tongues 130 each have a bead 132 of stiffly resilient material, which is not essentially of the same material as the respective tongue 130, constructed and arranged to frictionally engage the rear face of the respective section 30 central web 100 to removably lock the extensions in place. It should be evident that extensions 128 of different lengths can be provided for instance to increase the height of the display array three inches, six inches, one foot, three feet, etc. Likewise vertical extension of the left and right side frame elements 18 and 20 is provided by left and right side frame extensions of which a left one 134 is shown in FIGURE 2; a right one is a mirror image replica thereof.

The left side frame element extension 134 has a transverse cross-section identical to that of the left side frame element 18 throughout most of its length, being provided at its lower end with a beaded tongue 136 similar to the tongue 130 for frictional sliding receipt in the top of the channel 56 in the front face of the left frame element 18. The member 134 is also provided at the left near its lower end with a lock tab 138 which proceeds laterally leftwardly, then forwardly having a detent 140 formed in its forwardly extending portion for cooperative locking engagement with the socket 62 on the lock tab 60.

To extend the visual control device vertically, the extensions 128 and 134 are first emplaced, then the corner brackets 26, 28 and frame elements 14, 16 are moved upwardly as a unit by depressing the tongues 80 and elevating the unit to a new position near the upper ends of the extensions 128 and 134. The potential indicia array has thus been increased in height and further face pieces can be added to create new rows. Vertical contraction of the visual control device should be understood to involve a reversal of the steps just described.

To provide for horizontal expansion and contraction of the basic display 10, bottom frame element, top frame front element and top frame rear element leftward extensions 142, 144, 146 are provided each having a transverse cross-section substantially identical to that of the element which it extends, throughout most of its length, and being provided at its right end with an axially rightwardly extending tongue means 148, 150, 152, 154.

The bottom frame element extension 142 includes tongues 148, 150 constructed and arranged to be slidingly received in the left ends of two tubes 36. The tongue 150 has a leaf spring 156 extending axially rightwardly thereon, having fixed end 158 and a free end 160. A lock button 162 secured on the spring free end 160 is constructed and arranged to pop forwardly into a front-to-back hole 164 formed in the front of the forward tube 36 a short distance rightwardly of the left end thereof.

Similarly, the top frame front element extension 144 and top frame rear element extension 146, respective tongues 152 and 154 are respectively provided with leaf springs 166, 168 extending axially rightwardly thereon, having fixed ends 170 and free ends 172. A lock button 174 is secured on the free end of each spring 166, 168 and is constructed and arranged to pop into front-to back holes 176, 178 formed in the rear and front of the respective elements 16, 14 a short distance rightwardly of the left ends thereof.

To extend the visual control device horizontally, the extensions 142, 144 and 146 are slid and locked into the elements they respectively extend, then the corner brackets 26, 22 and left side frame element are slid leftwardly as a unit by depressing the tongue 98 and sliding the unit to a new position near the left ends of the extensions 142, 144 and 146. The tongue 98 is then released and the prongs 88, 90 engage in detents or openings 180, 182 formed in the upper surface of the left end regions of the extensions 144, 146. The potential indicia has thus been increased in width and further face piece holder backing sections 30 can be inserted in the frame in the opening created and new columns of face pieces 32 can be emplaced on the added sections 30. Horiontal contraction of the visual control device should be understood as involving a reversal of the steps just described.

The versatility of the display just described should now be evident. Individual face pieces can be replaced from anywhere in the face piece array, rows and columns can be added, removed, exchanged and replaced. Mistakes can be corrected without wastage of time and material and changing conditions and requirements can be accommodated over a long period.

It should be understood that various modifications can be made respecting the illustrative emodiments described herein without departing from the essential principles of the invention that has been disclosed. Accordingly, the invention should be understood as encompassing all such modifications as are within the spirit and scope of the following claims.

I claim:

1. A visual control system comprising: left side, right side, upper and lower frame elements; means securing said frame elements to one another at corners to define a frame; a plurality of individual face piece holder backing sections removably receivable in said frame in side-by-side relationship, each having a face presented forwardly; each face piece holder backing section being constructed and arranged to removably receive and retain a column of face pieces on the forwardly presented face thereof; backing section extensions each having a transverse cross sectional shape substantially identical to, and respective of said face piece holder backing sections throughout most of its length and being provided at its lower end with tongue means for removably securing respective of said backing section extensions to respective of said face piece holder backing section upper ends; left and right side frame element extensions each having a transverse cross sectional shape substantially identical to respective of said left side and right side frame elements throughout most of its length and being provided at its lower end with tongue means for removably securing respective of said left and right side frame element extensions to respective of said left and right side frame element upper ends; the means securing said left and right frame elements to one another comprising upper left and right corner brackets vertically selectively positionable on said left and right side frame element, and left and right side frame element extensions.

2. The visual control system of claim 1 wherein each face piece holder backing section forwardly presented face includes a vertical central web having a forwardly extending flange along each side margin thereof, the flanges at the forward ends thereof each having a portion extending a short distance toward the other defining an undercut, forwardly opening channel; a column of face pieces removably received in each channel in vertically stacked, forwardly substantially flush arrangement; each face piece comprising: a generally planar rectangular front portion having a front face and a rear face; means on said front face for receiving and displaying indicia thereon; and a pair of generally parallel, laterally spaced, vertical rearwardly projecting tabs integrally extruding from said rear face, said tabs terminating upwardly and downwardly flush with the respective upper and lower edges of the front portion and having integral, oppositely laterally directed flanges thereof at the rearward ends thereof; the flanges on said tabs cooperating with the flanges at the margins of the webs to hold said face pieces on the respective face piece holder backing sections.

3. The visual control system of claim 1 further comprising extension means for extending the upper and lower frame elements leftwardly; the means for securing the upper and lower frame members to one another comprising said upper left corner bracket and a lower left corner bracket, the upper and lower left corner brackets being horizontally selectively positionable on said upper and lower frame elements and extension means for increasing and decreasing the face piece holder backing section receiving area bounded by said frame.

4. The visual control system of claim 1 wherein each face piece holder backing section has a laterally outwardly opening groove runing centrally vertically along one side thereof and a complementary laterally outwardly directed tongue running centrally vertically along the opposite side thereof for interdigitating adjacent face piece holder backing sections; the face piece holder backing section respective sides, fore and aft of the groove and tongue thereon, being normal to the front of the system, and being constructed and arranged to abut the respective sides of adjacent face piece holder backing sections when interdigitated, to maintain the face piece holder backing sections in a copolanar condition respecting the forward faces thereof.

5. The visual control system of claim 1 wherein the lower frame element comprises an upwardly opening U-shaped channel member adapted to receive and support the lower ends of the face piece holder backing sections.

6. The visual control system of claim 5 further comprising interengaging locking means on the U-shaped channel member interiority thereof and on the face piece holder backing sections near the lower ends thereof for retaining the face piece holder backing sections in the frame while providing for intentional removal therefrom.

7. The visual control system of claim 6 wherein the upper frame element comprises two generally horizontal, parallel generally tubular elements spaced from one another in the front-to-back direction respecting the visual control system so as to define a laterally elongated vertically opening gap therebetween, said face piece holder backing sections being received downwardly into said frame through said gap and having the upper ends thereof held between said two tubular elements.

8. The visual control system of claim 2 wherein said face piece tabs and flanges are composed of stiffly resilient material.

9. The visual control system of claim 2 wherein said receiving means of at least one said face piece comprises a surface adapted to receive markings thereon.

10. The visual control system of claim 2 wherein said receiving means of at least one said face piece comprises a modular rectangular grid on said front face thereof.

11. The visual control system of claim 2 wherein said receiving means of at least one said face piece comprises a modular rectangular pattern of holes constructed and arranged for removably receiving indicia marker pegs.

12. The visual control system of claim 2 wherein said receiving means of at least one said face piece comprises a pair of flanges integrally forwardly projecting from said front face along the upper and lower margins thereof, having flange portions extending toward one another at the forward ends of the flanges for removably horizontally slidingly receiving indicia bearing cards.

13. The visual control system of claim 2 wherein said receiving means of at least one said face piece comprises at least one oblique slot in said front face thereof constructed and arranged for removably receiving one corner of an indicia bearing card.

14. The visual control system of claim 2 wherein said receiving means of at least one said face piece comprises a ferromagnetic surface on said front face thereof.

15. A visual control system comprising: left side, right side, upper and lower frame elements; means securing said frame element to one another at corners to define a frame; a plurality of individual face piece holder backing sections removably receivable in said frame in side-by-side relationship, each having a face presented forwardly; each face piece holder backing section being constructed and arranged to removably receive and retain a column of face pieces on the forwardly presented face thereof; extension means for extending the upper and lower frame elements in one horizontal sense to widen said system; the means for securing the upper and lower frame members to one another comprising an upper one corner bracket and a corresponding lower one corner bracket, the upper and lower one corner brackets being horizontally selectively positionable on said upper and lower frame elements and on said extension means, for increasing and decreasing the face piece holder backing section receiving area bounded by said frame.

16. A visual control system comprising: left side, right side, upper and lower frame elements; means securing said frame elements to one another at corners to define a frame; a plurality of individual face piece holder backing sections removably receivable in said frame in side-by-side relationship, each having a face presented forwardly; each face piece holder backing section being constructed and arranged to removably receive and retain a column of face pieces on the forwardly presented face thereof; the means for securing said frame elements to one another at the corners comprising four corner brackets respectively for connecting the upper and left side frame elements, the upper and right side frame elements, the lower and left side frame elements and the lower and right side frame elements; at least two like frame elements being provided with respective, removable extension means of transverse cross section, similar thereto for lengthening and shortening the respective frame elements to increase and decrease the face piece holder backing section receiving area bounded by said frame; respective two adjacent of said corner brackets being selectively positionable on the frame elements having said removable extension means and upon said extension means themselves; means for locking said two adjacent corner brackets on the last-mentioned frame elements and extension means.

*17. A visual control system comprising: left side, right side, upper and lower frame elements; means securing said frame elements to one another at corners to define a frame; left and right side frame element extensions each having a transverse cross-sectional shape substantially identical to respective of said left side and right side frame elements throughout most of its length and being provided at its lower end with tongue means for removably securing respective of said left and right side frame element extensions to respective of said left and right side frame element upper ends; the means securing said left and right frame elements to one another including upper left and right corner brackets vertically selectively positionable on said left and right side frame element and on said left and right side frame element extensions.*

*18. The visual control system of claim 17 further comprising extension means for extending the upper and lower frame elements in a horizontal direction; the means for securing the upper and lower frame members to one another including an upper corner bracket and a lower corner bracket on the side of said frame corresponding to said horizontal direction, said upper and lower corner brackets being horizontally selectively positionable on said upper and lower frame elements and said extension means for increasing and decreasing the area bounded by said frame.*

*19. The visual control system of claim 17 wherein the lower frame element comprises an upwardly opening U-shaped channel member adapted to receive and support the lower end of means for displaying indicia within the area bounded by said frame.*

*20. The visual control system of claim 19 further comprising interengaging locking means on the U-shaped channel member interiorly thereof for retaining the means for displaying indicia within the area bounded by said frame in the frame while providing for intentional removal therefrom.*

*21. The visual control system of claim 20 wherein the upper frame element comprises two generally horizontal, parallel generally tubular elements spaced from one another in the front-to-back direction respecting the visual control system so as to define a laterally elongated vertically opening gap therebetween through which means for displaying indicia within the area bounded by said frame may be removably received so as to have the upper extent thereof held between said two tubular elements.*

*22. A visual control system comprising: left side, right side, upper and lower frame elements; means securing said frame elements to one another at corners to define a frame; extension means for extending the upper and lower frame elements in one horizontal sense to widen said system; the means for securing the upper and lower frame members to one another including an upper one corner bracket and a corresponding lower one corner bracket, the upper and lower one corner brackets being horizontally selectively positionable along the lengths of said upper and lower frame elements and along the lengths of said extension means, for increasing and decreasing the area bounded by said frame.*

*23. A visual control system comprising: left side, right side, upper and lower frame elements; means securing said frame elements to one another at corners to define a frame; the means for securing said frame elements to one another at the corners comprising four corner brackets respectively for connecting the upper and left side frame elements, the upper and right side frame elements, the lower and left side frame elements and the lower and right side frame elements; at least two like frame elements being provided with respective, removable extension means of transverse cross-section similar thereto for lengthening and shortening the respective frame elements for increasing and decreasing the area bounded by said frame; respective two of said corner brackets being selectively positionable along the lengths of the frame elements having said removable extension means and along the lengths of said extension means themselves; means for locking said two corner brackets on the last-mentioned frame elements and extensioin means.*

References Cited

The following references, cited by the Examiner, are of record in the patented file of this patent or the original patent.

UNITED STATES PATENTS

| | | | |
|---|---|---|---|
| 1,346,691 | 7/1920 | Babcock | 40—155 |
| 1,121,809 | 12/1914 | DeSilva | 40—63 |
| 2,866,286 | 12/1958 | Hartman | 40—155 |
| 3,076,890 | 2/1963 | Guth | 40—143 UX |
| 3,289,340 | 12/1966 | Edwards | 40—143 |

FOREIGN PATENTS

| | | | |
|---|---|---|---|
| 707,382 | 4/1931 | France | 40—143 |
| 628,438 | 11/1961 | Italy | 40—63 R |

WILLIAM H. GRIEB, Primary Examiner

U.S. Cl. X.R.

40—155